E. G. MATTHEWS, OF NEWTON, ASSIGNOR TO F. F. HOLBROOK, OF DORCHESTER, MASSACHUSETTS.

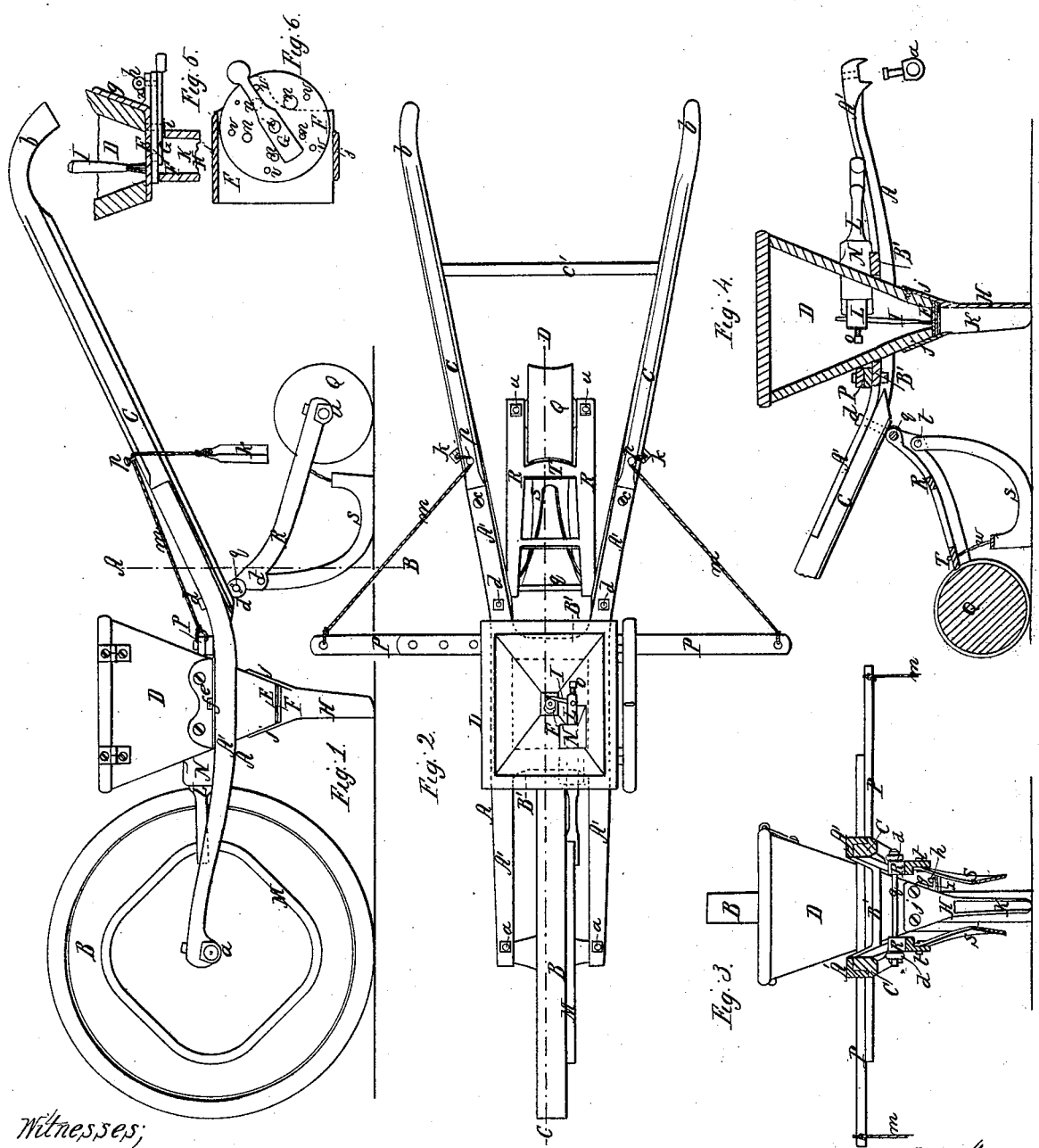

Letters Patent No. 88,971, dated April 13, 1869.

IMPROVEMENT IN SEED-SOWERS AND PLANTERS.

The Schedule referred to in these Letters Patent and making part of the same.

*Know all men by these presents:*

That I, E. G. MATTHEWS, of Newton, in the county of Middlesex, and Commonwealth of Massachusetts, have invented certain new and useful Improvements in Seed-Sowers and Planters; and I do hereby declare that the following is a full, clear, and exact description of the same, reference being had to the accompanying drawings, forming a part of this specification, in which—

Figure 1 represents a side view of my improved seed-sower and planter;

Figure 2 represents a plan view of my improved seed-sower and planter;

Figure 3 represents a transverse section on line A B, fig. 1;

Figure 4 represents a longitudinal section on line C D, fig. 2;

Figure 5 represents a rear view of the seed-dropping device and the lower end of the hopper, shown in section; and Figure 6 represents a bottom view of the dropping-device.

To enable those skilled in the art to which my invention belongs to make and use the same, I will proceed to describe it more in detail.

The nature of my invention consists—

First, in the combination, with the handles and seed-box, of a malleable iron, or other metal frame, as will be hereafter explained.

Second, in the combination, with the hopper and wheel, of peculiar devices for agitating the seed, as hereafter described.

Third, in the combination, with the main and hinged follower frames of the machine, of eye-bolt bearings, as shown and hereinafter described.

Fourth, in the combination, with the frame, of pins for holding up the markers, as hereafter described.

Fifth, in the combination, with the inner surface of the seed-tube or conductor, of a white lining, or coating, as and for the purposes hereafter described.

Sixth, in the combination, with the bottom of the hopper, of peculiar devices for holding the dial-plate and dropping the seed, as hereafter explained.

Seventh, in a hand seed-sower and planter, the parts of which are combined together and arranged to be operated substantially as and for the purposes hereafter described.

The main frame of my hand-sower and planter, indicated in the drawings by letter A, is made of malleable iron, or other suitable metal.

Its form is indicated in fig. 2 by full and dotted lines, being composed of two sides A', connected by cross-pieces B', the whole cast in one piece.

In the front end of the frame A are secured eye-bolt bearings, $a$, in which turn the journals of the travelling-wheel B, said wheel being supported between the projecting parts of the frame, as shown in the drawings.

The rear projections of the main frame are curved upward and outward, and to these are secured the hand-bars C, which terminate in curved handles $b$.

The frame A is cast with flanges along its outer edges, and the hand-bars are fitted thereto and fastened by screws or bolts, $c$, at the ends of the metallic frame, and by the eye-bolts $d$, at the end of the hand-bars, as fully indicated in the drawings.

The hand-bars are braced in the usual manner by a rod, C', passing from one to the other.

Between the transoms or cross-pieces B' of the frame A is arranged the hopper D for holding the seed.

It is held in place by flanged ear-pieces $e$, which are screwed to the sides of the hopper D and secured to the main frame A by a single bolt, $f$, in each.

By having only two bolts to take out to remove the hopper, the labor of taking down and setting up the machine is greatly facilitated.

The bottom of the hopper is provided with a metallic dial-plate, E, having in its central part a hole for the passage of the seed.

The plate E is secured to the hopper by a flange, $g$, which extends up one side of the hopper, and is fastened thereto by screws, and a portion of the plate $x$ extends out beyond the outside of the hopper, in which is a hole to receive the pin $h$, (for holding the dial in any desired position,) and at the same time forming a guard to protect the projecting part of the dial.

The hole in the dial-plate E is formed larger than is required for the passage of the seed to prevent clogging, and below it is placed the dropping-dial F, formed of a circular plate of metal, secured, at its centre, to the dial-plate E by a pivot, $i$.

Holes, $n$, of various sizes, to admit the passage of different-sized seeds, are made through the dial F, and other holes, $v$, are formed, near its edge, through which to pass the pin $h$, whereby the dial F is retained in position.

The holes $v$ are numbered from one upward, whereby the proper hole for passing any desired size of seed may be brought into position and there retained by means of the pin $h$.

In using different-sized seeds, the dial F is turned until the proper-sized hole is brought beneath the opening in the dial-plate E, when it is secured in place, as above described.

Beneath the dial F, and hung on the pivot $i$, is a gate, G, which can be moved around to close the hole $n$ and cut off the flow of seed, which is very convenient and desirable in passing the ends of the rows, or in crossing or going to and from the field.

A conductor, H, is arranged below the dropping-device to conduct the seed to the ground, being formed, in this instance, with strips of metal, $j$, that extend up the front and rear sides of the hopper D, and are secured thereto by screws or bolts.

The conductor H is left open at the rear, as usual, but its inner surface $k$ is lined with a coating of white enamel, japan, paint, or some other light and durable substance, so that the operator, while travelling behind the machine, can, at a glance, detect any irregularity, or dropping of the seed.

This last feature is of importance, since it insures the proper planting of the entire ground, thus obviating, in this respect, a great objection to the use of hand-planters, as constructed prior to my invention, in which the inner surface of the conductors being of dark color, it is impossible for the operator to determine whether or not the seed is dropping while the machine is in motion.

In the interior of the hopper is an agitator, I, the lower end of which is furnished with a bristle-brush, which passes back and forth over the hole in the dial-plate and stirs the seed without injury thereto.

The top end of the agitator I is secured to a connection-rod, L, which passes out through the front side of the hopper D, and is furnished, near its end, with a groove that fits on to a flange-cam, M, on the side of the travelling-wheel B, and by means of which the agitator is operated.

A box, N, is fitted around the connecting-rod L, where it passes through the side of the hopper D, which forms a tight joint, preventing the escape of the seed, and also hold the connecting-rod L steady, so that it will have an even back-and-forward motion.

By the use of the cam to operate the agitator, a positive and regular movement is obtained.

The agitator may be adjusted up or down by the screw $o$ in the end of the connecting-rod L.

At the rear of the hopper D, bolted across the top of the frame A, are two adjustable bars P, to the ends of which are fastened, by means of cords or chains $m$, drag-weights $k$, for marking upon the ground the position of the next row to be planted, and pins or hooks $p$ may be fixed in the tops of the hand-bars C, upon which to hitch up the markers when not in use, as indicated in the drawings, figs. 1 and 2.

By this arrangement, the operator is enabled to hitch up and drop either or both of the marking-weights or chains, as occasion may require, without leaving his position at the rear of the machine.

The covering-device is attached to the main frame A by a rod, $q$, that passes through the eye-bolt $d$ and the forward ends of the follower-frame R, beneath which and hinged thereto, at $t$, is a coverer, S, and at the rear end of the follower-frame R is a concave-faced pressing-roll, Q, that is supported and turns in eye-bolt bearings, $u$, arranged in the ends of the follower-frame R, as fully shown in the drawings.

The coverer S is, in this instance, made in a single piece, whereby the sides are left smooth, and are not liable to catch and drag along the grass and roots, while at the same time its manufacture is much cheapened and simplified.

The frame R is made of malleable iron, or other metal, and is cast in one piece, together with the cleaner T, that extends across in front of the pressing-roll G, and keeps the concave face of said roll free from dirt.

The coverer S has a cord or chain, $w$, that attaches it to the cleaner to prevent it at any time from swinging too far away from the follower-frame R.

The operation is as follows:

The seed to be planted is placed in the hopper D, its cover closed and secured, and the dial F adjusted to pass the particular seed to be planted. The gate G is then opened, and the machine moved forward, when the conductor H forms a small furrow in the ground, and the seed being stirred by the agitator passes freely through the hole $n$ in the dropping-dial F, and falls into the furrow thus made. Then, as the machine is moved forward, the dirt is scraped over the seed by the coverer S, and rolled down by the concave-faced pressing-roll Q, whereby the surface of the earth above the seed is left in a convex ridge. This ridge turns or conducts the water off in case of rain, so that the seed will not be subjected to injury from too great an amount of moisture, which would be the case if the surface above the seed were left flat, or a little concave, as is the case when seed-planters now in common use are used.

It will be observed that by the use of a malleable iron, or other metal frame, A, cast whole, the manufacture of the machine is greatly facilitated, while at the same time a machine is produced that is more durable, simple, and compact than those made in the ordinary way; that is, where the side-pieces to which the wheel and seed-box are attached are formed from the same piece of wood as the handle, said pieces being sawed or bent into proper form.

Uniformity of the parts is also obtained, which is of importance in constructing and repairing the machines.

They are also constructed in such a manner that they may readily be taken apart and put together, and can be packed compactly for shipment, thus avoiding considerable labor and expense.

It will be seen that the dial-plate E is supported so as to project from one side of the machine, whereby it can be adjusted in a very convenient manner without tipping or turning the machine over.

Having described my improved seed-sower and planter,

What I claim therein as new, and of my invention, and desire to secure by Letters Patent, is—

1. The metal frame, for supporting the wheel B, hopper, or seed-box D, and hand-bars C, substantially as and for the purposes set forth.

2. The combination, with the seed-box or hopper D and cam M, of the connecting-rod or arm L and stirrer or agitator I, substantially as and for the purposes set forth.

3. The combination, with the forward ends of the side-pieces A, of the peculiarly constructed eye-bolt bearings $a$, substantially as shown and described.

4. The combination, with the sides of the frame or hand-bars C, of the holding-pins or hooks $p$, substantially as and for the purposes set forth.

5. The combination of the enamelled open conductor and the frame, the whole being constructed and arranged substantially as and for the purposes set forth.

6. The combination, with the bottom of the hopper D, of the peculiarly constructed dial-holding plate E, having the projections $y$ and $x$, substantially as shown and described.

7. The arrangement of the dial-plate E and dial F, and the device for holding the latter in place, substantially as described, whereby the dial can be adjusted without tipping or turning over the machine, as set forth.

8. The combination and arrangement, with the dial F of the gate or cut-off G, pivoted or mounted upon the axis of the said rotating-dial, and applied to the under side of the same, substantially as shown and set forth.

E. G. MATTHEWS.

Witnesses:
   Thos. H. Dodge,
   D. L. Miller.